(12) United States Patent
Henning et al.

(10) Patent No.: US 10,723,655 B1
(45) Date of Patent: Jul. 28, 2020

(54) AGGLOMERATE GLASS SURFACE PRODUCT AND METHOD OF MANUFACTURE

(71) Applicant: Bruskin International, LLC, Van Nuys, CA (US)

(72) Inventors: Wayne Henning, Xiamen (CN); Albert Barry Smith, Los Angeles, CA (US)

(73) Assignee: Bruskin International, LLC, Van Nuys, CA (US)

( * ) Notice: Subject to any disclaimer, the term of this patent is extended or adjusted under 35 U.S.C. 154(b) by 0 days.

(21) Appl. No.: 16/268,757

(22) Filed: Feb. 6, 2019

Related U.S. Application Data

(60) Provisional application No. 62/693,239, filed on Jul. 2, 2018.

(51) Int. Cl.
| | |
|---|---|
| *C04B 18/02* | (2006.01) |
| *C04B 30/00* | (2006.01) |
| *C04B 20/02* | (2006.01) |
| *C04B 40/00* | (2006.01) |
| *B24B 7/24* | (2006.01) |

(52) U.S. Cl.
CPC .......... *C04B 18/022* (2013.01); *C04B 20/023* (2013.01); *C04B 30/00* (2013.01); *C04B 40/0089* (2013.01); *B24B 7/241* (2013.01)

(58) Field of Classification Search
CPC ... C04B 18/022; C04B 40/0089; C04B 30/00; C04B 20/023; B24B 7/241
See application file for complete search history.

(56) References Cited

U.S. PATENT DOCUMENTS

| | | | |
|---|---|---|---|
| 3,396,067 A | 8/1968 | Schafer | |
| 4,657,791 A | 4/1987 | Ukkonen | |
| 5,364,672 A | 11/1994 | Schultze-Kraft | |

(Continued)

FOREIGN PATENT DOCUMENTS

| | | | | |
|---|---|---|---|---|
| WO | WO0044686 | | 8/2000 | |
| WO | WO2010115225 | | 10/2010 | |
| WO | WO-2010115225 A1 * | 10/2010 | ........... B29C 43/003 |

OTHER PUBLICATIONS

Google Translation for WO-2010115225-A1 listed above. Retrieved on Apr. 11, 2019. (Year: 2019).*

(Continued)

*Primary Examiner* — Nathan L Van Sell
(74) *Attorney, Agent, or Firm* — Walter W. Duft (57) ABSTRACT

An agglomerate glass surface product may include an agglomerate formed predominantly of glass aggregate having controlled proportions of different glass particle sizes bound by a cured thermoset binder infused within substantially all inter-aggregate voids. The agglomerate may be in the form of a pressed slab that is substantially non-porous and substantially devoid of air inclusions throughout an entire thickness of the slab. The glass aggregate may be substantially uniformly mixed with the thermoset binder throughout the entire thickness of the slab so as to be exposed at all surfaces of the slab. The agglomerate may have an overall aggregate content that is high enough to produce a slab surface that can be polished in the same manner and with the same machinery that natural stone is polished. Advantageously, the slab may have the look and feel of a natural stone slab. A related manufacturing method is also disclosed.

20 Claims, 4 Drawing Sheets

(56) References Cited

U.S. PATENT DOCUMENTS

| | | | |
|---|---|---|---|
| 5,375,777 A | 12/1994 | Pehrson | |
| 6,350,501 B1 | 2/2002 | Guariento | |
| 6,770,328 B1 | 8/2004 | Whaley | |
| 7,141,296 B2 | 11/2006 | Frank | |
| 7,700,017 B2 | 4/2010 | McCarthy et al. | |
| 8,679,623 B2 | 3/2014 | Webster | |
| 2002/0143093 A1* | 10/2002 | Kolarik | B28B 11/04 524/443 |
| 2005/0065260 A9* | 3/2005 | Kolarik | B28B 11/04 524/443 |
| 2006/0138385 A1* | 6/2006 | Yamanashi | B32B 27/04 252/301.36 |
| 2009/0286902 A1 | 11/2009 | Grasso, Jr. | |
| 2012/0115983 A1* | 5/2012 | Ramon Moreno | C04B 26/18 523/122 |
| 2012/0196087 A1* | 8/2012 | Albalak | C04B 41/009 428/142 |
| 2013/0245156 A1* | 9/2013 | Buskila | B28B 1/004 523/171 |
| 2015/0042006 A1* | 2/2015 | Kager | B28B 1/005 264/73 |
| 2015/0151456 A1 | 6/2015 | Crawley | |
| 2015/0209984 A1* | 7/2015 | Benito Lopez | E04C 2/02 428/220 |

OTHER PUBLICATIONS

Affinity Kitchen & Bath, "Recycled Glass Countertops", at least as early as May 24, 2018, 5 pages.

EOS Solid Surfaces, "Geos Recycled Glass Surface", at least as early as May 24, 2018, 2 pages.

Wikipedia, "Engineered Stone", at least as early as May 24, 2018, 5 pages.

Countertop Guides, "The Benefits of Engineered Stone Countertops", at least as early as May 24, 2018, 5 pages.

* cited by examiner

AGGLOMERATE GLASS SURFACE PRODUCT AND METHOD OF MANUFACTURE

BACKGROUND

1. Field of the Disclosure

The present disclosure relates generally to agglomerate surface products. More particularly, the disclosure concerns agglomerate products that contain glass aggregate as an ecologically-friendly alternative to natural stone aggregate.

2. Description of the Prior Art

By way of background, agglomerate surface products made from natural stone aggregate have been used extensively for applications such as countertops, wall panels and flooring. These products represent composite articles made from crushed stone aggregate and a suitable binder, such as a thermosetting polymer or cement, and typically formed into slabs. The two most common aggregates used for engineered stone slabs are quartz and marble. When properly manufactured, engineered quartz and marble slabs have all of the functional and aesthetic qualities of quarried slabs.

It would be desirable to provide agglomerate glass surface products in which the agglomerate is formed predominantly of glass aggregate. An agglomerate glass surface product could provide an ecologically-friendly alternative to engineered stone. A challenge facing such a design effort is the need to produce products that are fully comparable to engineered stone (which in turn is designed to mimic natural stone). An agglomerate glass surface product must satisfy all of the functional requirements of engineered stone (including the ability to be machine-polished), and must have the same aesthetic qualities in terms of look and feel (including the granular appearance and "cool-to-touch" quality of stone).

SUMMARY

Disclosed herein is an agglomerate glass surface product and related manufacturing method for producing the agglomerate glass surface product.

In an embodiment, the agglomerate glass surface product may include an agglomerate formed predominantly of glass aggregate having controlled proportions of different glass particle sizes bound by a cured thermoset binder infused within substantially all inter-aggregate voids. The agglomerate may be in the form of a pressed slab that is substantially non-porous and substantially devoid of air inclusions throughout an entire thickness of the slab. The glass aggregate may be substantially uniformly mixed with the thermoset binder throughout the entire thickness of the slab so as to be exposed at all surfaces of the slab. The agglomerate may have an overall aggregate content that is high enough to produce a slab surface that can be polished in the same manner and with the same machinery that natural stone is polished. Advantageously, the slab may have the look and feel of a natural stone slab.

In an embodiment, the manufacturing method may include preparing a dry mixture containing the glass aggregate, preparing a wet mixture containing an uncured thermosetting resin and a hardener, and preparing a wet aggregate mixture containing the dry mixture and the wet mixture. The wet aggregate mixture may be placed in a slab press and vibrated while applying vacuum, then applying positive pressure for a selected time while continuing to vibrate to create an uncured slab. The uncured slab may be cured at a selected time and temperature to produce a cured slab. The cured slab may be calibrated to a desired thickness and polished to a desired gloss level to produce the final pressed slab.

BRIEF DESCRIPTION OF THE DRAWINGS

The foregoing and other features and advantages will be apparent from the following more particular description of example embodiments, as illustrated in the accompanying Drawings.

DETAILED DESCRIPTION OF EXAMPLE EMBODIMENTS

Disclosed herein is an agglomerate glass surface product, formed as a pressed slab, that has been meticulously designed to mimic the properties of both natively-quarried and engineered quartz or marble slabs. The disclosed agglomerate glass surface product meets all of the functional requirements of quartz and marble slabs, and importantly, has virtually indistinguishable aesthetic qualities in terms of look and feel. Such functional requirements and qualities include structural strength and rigidity, absorption resistance, and the ability to be polished in the same manner and with the same machinery that natural stone is polished, and the ability to visually display the same granular appearance and impart the same "cool-to-touch" quality as stone.

Agglomerate Glass Surface Product

In an embodiment, the agglomerate glass surface product disclosed herein may include an agglomerate formed predominantly of glass aggregate having controlled proportions of different glass particle sizes bound by a cured thermoset binder infused within substantially all inter-aggregate voids. As used herein, the term "glass" refers to any inorganic non-crystalline amorphous solid, including but not necessarily limited to silicate glasses, obtained from any source, including but not necessarily limited to pre-consumer and post-consumer waste streams, i.e. recycled glass. As used herein, the term "formed predominantly of glass aggregate" means that the glass content by weight is greater than any other constituent in the agglomerate.

The glass, which may be crushed (or ground) to provide a range of aggregate particle sizes, may be bound by a cured thermoset binder infused within substantially all inter-aggregate voids between the glass particles. As used herein, the term "cured thermoset binder" refers to any polymer that has been irreversibly cured from a soft solid or viscous liquid, prepolymer or resin. Suitable thermosetting polymers include but are not necessarily limited to unsaturated polyester resins, acrylic resins, epoxy resins, vinyl ester resins, amino resins, phenolic resins, and combinations thereof.

Figure 1:
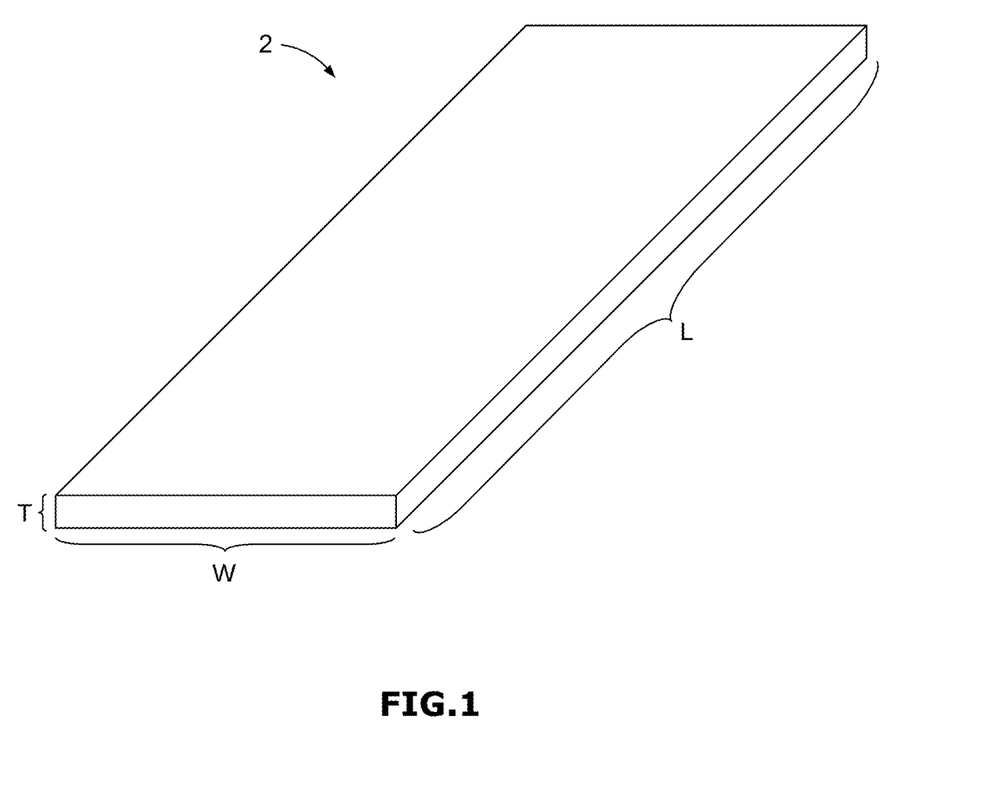
FIG. 1 is a perspective view showing a pressed slab representing an embodiment of an agglomerate glass surface product that may be manufactured in accordance with the present disclosure.

The agglomerate may be in the form of a pressed slab, the entire thickness of which is substantially non-porous and substantially devoid of air inclusions that can harbor bacteria and other unwanted contaminants. An example slab 2 is illustrated in FIG. 1. The slab 2 is shown as having a length dimension "L," a width dimension "W," and a thickness dimension "T." Although the slab 2 is depicted in a substantially rectangular configuration, it should be understood that the slab may be cut, contoured or otherwise formed into different shapes to facilitate installation for a particular end-use application (such as a countertop). As used herein, the term "slab" is not intended to connote any particular shape or size. However, a "slab" as used herein will normally be characterized by the thickness "T" being substantially smaller than either the length "L" or the width "W," and usually both. In an embodiment, the slab 2 may have thickness "T" between about 0.5-1.25 in., whereas the length "L" and width "W" may be measured in feet. By way of example and not limitation, the length "L" may be about 10 ft. and the width "W" may be about 4.65 ft. For this particular non-limiting example, it will be seen that the length-to-thickness ratio is between about 96-240:1, and the width-to-thickness ratio is about 45-112:1.

The glass aggregate may be substantially uniformly mixed with the cured thermoset binder throughout an entire thickness of the slab 2 so as to be exposed at all surfaces of the slab, thereby allowing a surface of the slab to be polished in the same manner and with the same machinery that natural stone is polished. In an embodiment, the slab 2 has at least one polished surface having exposed glass aggregate, together with exposed thermoset binder.

To facilitate the look and feel of natural stone, embodiments of the agglomerate may have a glass aggregate content of at least about 90 wt %, and preferably between about 91-93 wt %, with the mesh sizes and ratios of the glass aggregate particles being selected to produce a slab 2 that is substantially free of air inclusions and substantially non-porous throughout an entire thickness of the slab, as previously noted. In such embodiments, the remaining approximately 7-10 wt % of the agglomerate may consist entirely of the cured thermoset binder together with possibly added colorants, such as pigments or other coloring agents. Advantageously, the ability to achieve such high levels of high glass aggregate content allows for an agglomerate glass surface product having thermal-conductive properties that are conducive to the surface feeling like stone (cold) rather than plastic (warm) when touched. In embodiment, the glass aggregate is substantially transparent in order to approximate the appearance of engineered stone, with any desired coloring being provided by an added colorant. Alternatively, some or all of the glass aggregate may be colored glass.

In other embodiments, the agglomerate may contain glass aggregate plus additional non-glass aggregates that may be used to provide desired aesthetic effects. Examples of non-glass aggregates include but are not limited to natural stone such as quartz or marble, metals such as brass, seashells, etc. Notwithstanding the presence of such non-glass aggregates, the glass aggregate will always remain the predominant agglomerate component. As noted above, this means that the glass content of the agglomerate by weight is greater than the content by weight of any other constituent in the agglomerate.

In an embodiment, the glass aggregate may be a crushed (or in some cases ground) glass aggregate that is shape-modified following crushing (or grinding) to produce controllably-softened particle facets that are substantially devoid of sharp edges. In an embodiment, the shape modification (a.k.a. particle modification) process may utilize tumbling, with or without a wetting agent. Example processing that may be used to produce the shape-modified glass aggregate is described in more detail below. The purpose of the particle modification processing is to create a more rounded particle with a smoother surface in order to achieve the maximum wt % of glass aggregate in the finished product by means of improving the efficiency and effectiveness of particle placement in the agglomerate. By utilizing controlled, efficiently-selected proportions of different glass aggregate sizes, and by allowing the aggregate particles to more efficiently migrate to their intended location within the agglomerate, it is possible to reduce inter-aggregate void size, and thereby increase the total wt % of glass aggregate. The particle modification processing also enables and promotes a uniform mixture that is helpful in achieving uniform coloration during the production process. The shape-modified glass aggregate is also less prone to glass aggregate clumping, which can occur when ordinary (non-shape-modified) crushed (or ground) glass is used in the agglomerate.

In an embodiment, the glass aggregate may range in particle size between a mesh size of about 2-6# to a mesh size of less than about 400# (in some cases as small as 1000#). In addition to increasing glass aggregate packing efficiency, the use of a range of mesh sizes provides desired aesthetic effects. For example, the use of larger and midsize particles produces a natural stone-like appearance to the agglomerate due to the visibly different grain ratios. Smaller particle sizes also improve the aesthetics, and additionally help increase the agglomerate's glass aggregate density by reducing inter-aggregate void size. Relative to such smaller particles, an embodiment may include at least about 30 wt % of the glass aggregate having a mesh size not exceeding about 400#. In a further embodiment, about 1.8 wt % of the glass aggregate may have a mesh size of less than about 400# in the form of ultra-fine shape-modification byproducts. Described in more detail below are three example slabs having various glass aggregate mesh sizes in various controlled proportions to illustrate the above design principles.

Agglomerate Glass Surface Product Manufacturing Method

An example manufacturing method will now be described that may be used to produce an agglomerate glass surface product as described above, with the goal being to maximize the wt % of glass content in the finished product. Similar methods may be used to in which the aggregate in the agglomerate also includes other materials.

Dry Mix

In an embodiment, the manufacturing method may begin with the selection of glass aggregate. The aggregate selection may include a combination of different mesh sizes in carefully controlled proportions, measured by weight, to produce a slab of predetermined size. The purpose of combining various mesh sizes in controlled proportions is to achieve the maximum wt % of glass content in the finished product. The use of different mesh sizes mixed together in controlled proportions also produces different grain ratios for aesthetic value. In some cases, aggregate other than glass may be added for reasons such as aesthetic value. As previously noted, such aggregates may include, but are not limited to, natural stone materials, sea shells, metals such brass, etc. As also noted above, various colorants may likewise be added to provide additional aesthetic effects.

Once the various proportions of the glass aggregate constituents have been determined and weighed, the constituents may be combined together in what is referred to herein as a "dry mix." When mixing glass aggregate from large to ultra fine mesh size, a number of challenges arise. The crushing (or grinding) process use to create raw glass aggregate with different mesh sizes, especially the finer mesh sizes, causes uneven, multi-dimensional sharp facets with sharp jagged edges. This glass particle attribute contributes to glass aggregate clumping, making it difficult for the various ratios of particle sizes to migrate to a position that results in the least amount voids in the agglomerate. To overcome this, the shape of each particle may be modified using a process that may be referred to herein as a "particle modification" or "shape-modification" process.

Figure 2:
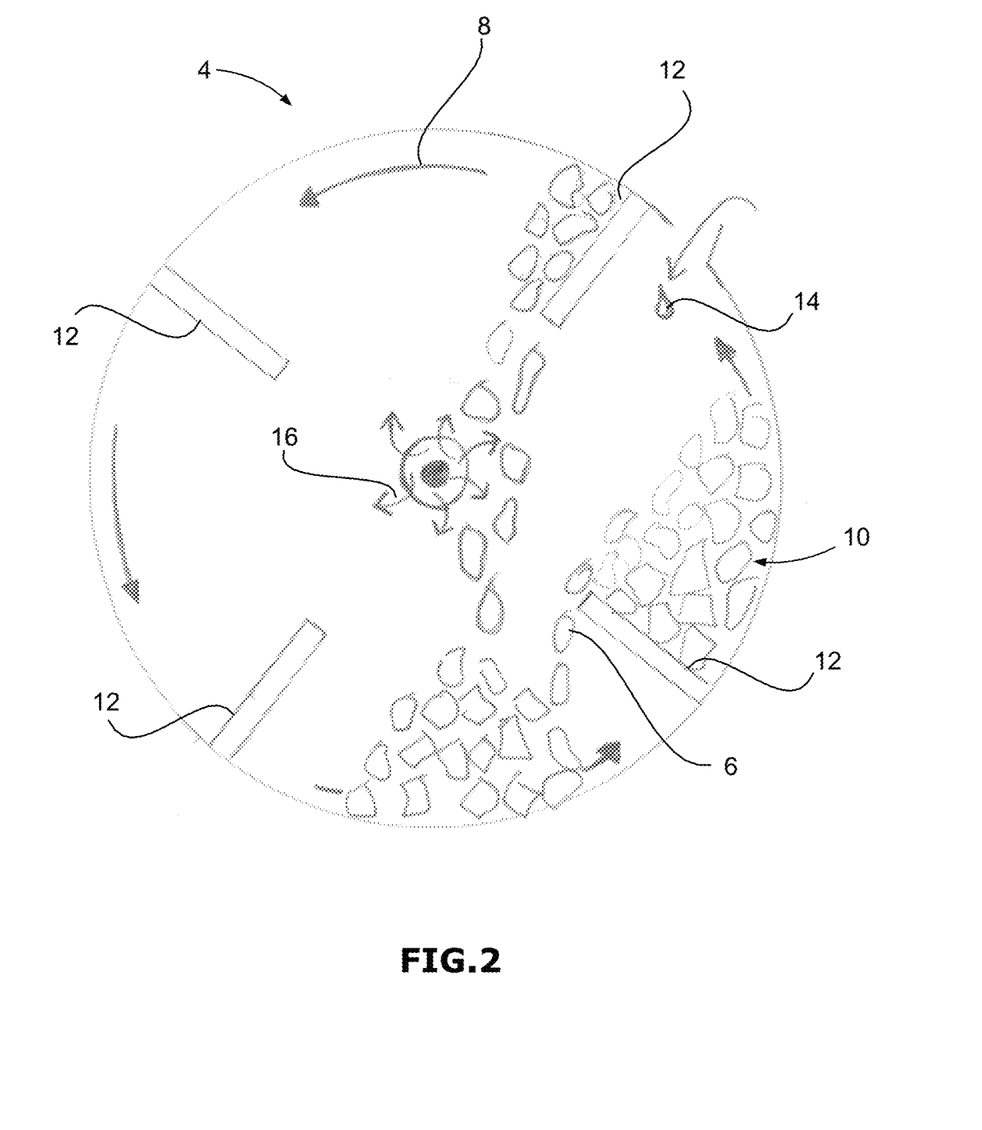
FIG. 2 is a diagrammatic plan view representation of a tumbling chamber that may be used to produce shaped-modified glass aggregate having controllably-softened particle facets that are substantially devoid of sharp edges to facilitate reduced inter-aggregate void size.

The particle modification process may be implemented as a glass aggregate tumbling operation that begins with the dry mix being transferred to an enclosed rotation chamber. FIG. 2 diagrammatically illustrates an example rotation chamber 4 that may be used for tumbling various glass aggregate particles 6 disposed therein. The rotation chamber 4 rotates in a singular direction 8. As the rotation chamber 4 rotates in the direction 8, the glass aggregate particles 6 migrate outwardly as shown by reference number 10 and are tumbled in a circumferential direction by radial paddles 12. Friction between the individual glass particles modifies the shape of the particles, smoothing out the angular facets and easing the sharp edges. These effects are described in more detail below in connection with FIGS. 3 and 4.

To prevent excessive/aggressive grinding during the particle modification process, a wetting agent 14 of around 1 wt % (relative to the dry mix) may be added. The wetting agent 14 may be of any suitable type used for industrial applications, including but not limited to Guerbet alcohol. The wetting agent 14 reduces the amount of friction between the individual glass particles, and hence mediates the aggressiveness of tumbling action. By controlling the aggressiveness of the particle modification process, a preferable particle shape is achieved, as described in more detail below.

During the particle modification process, finer glass aggregate particles are produced as shape-modification byproducts. These particles may include fine glass aggregate particles having a mesh size of about 400#, and ultra-fine glass aggregate particles having a mesh size of less than about 400#. The production of these shape-modification byproducts, the size and volume of which is controlled in part by the wetting agent 14, results in a desirable range of aggregate particles sizes at desirable weight ratios. This in turn results in an ability to increase the glass aggregate content to about 90 wt % and higher.

The fine and ultra-fine mesh sizes representing the shape-modification byproducts, namely the glass particles of mesh size 400# and smaller, may have a tendency to draw in and hold moisture. This may cause the smaller size glass particles to lump together within the rotation chamber 4. In that case, heated substantially moisture-free air 16 may be pumped into and circulated within the rotation chamber 4. The air 16 helps remove moisture from the aggregate 4, break apart the lumps, and free the smaller size glass particles. This action also allows the wetting agent to interact with the glass particles once the lumps are broken down.

Figure 3A:
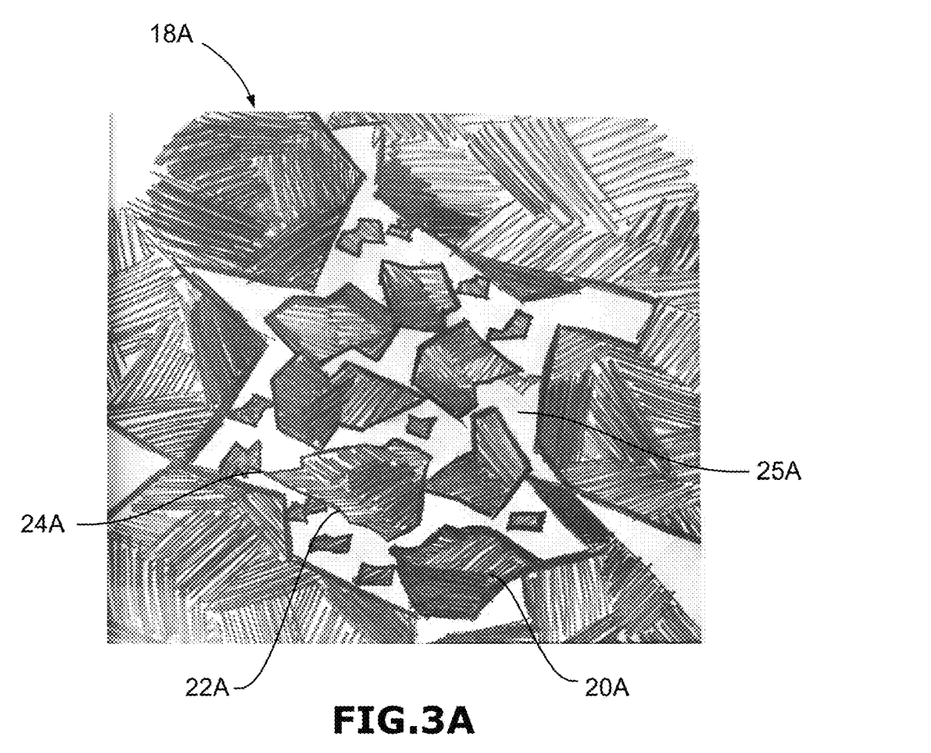
FIGS. 3A and 3B are diagrammatic cross-sectional representations of example dry glass aggregate mixtures, with FIG. 3A showing a first mixture in which the glass aggregate has not been shape-modified to controllably-soften the glass particle facets, and FIG. 3B a second mixture in which the glass aggregate has been shape-modified to controllably-soften the glass particle facets, such that the facets are substantially devoid of sharp edges.
Figure 3B:
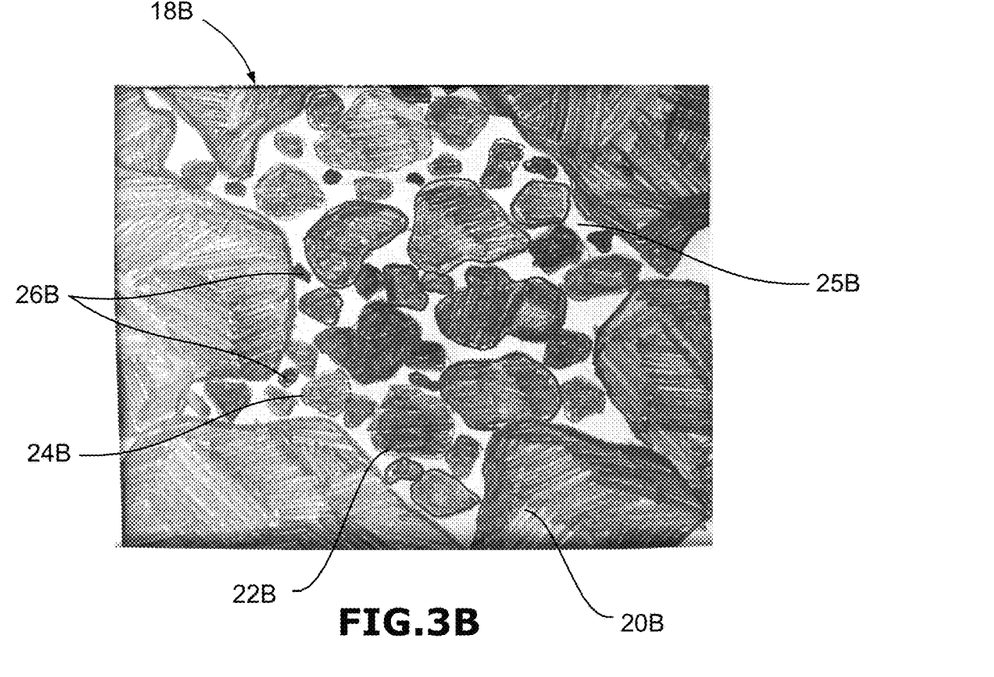

FIGS. 3A and 3B are illustrative of the effects of particle modification. FIGS. 3A and 3B are diagrammatic cross-sectional representations of two examples of dry glass aggregate mixtures 18A and 18B, respectively.

FIG. 3A shows the first dry glass aggregate mixture 18A in which glass particles 20A have not been shape-modified to controllably-soften the glass particle facets. In this state, many of the glass particles 20A have uneven, multi-dimensional sharp facets 22A with sharp jagged edges 24A. The angular facets 22A of the individual particles 20A prevent the glass particles 20A from seating in close enough proximity to each other to minimize the voids 25A between the particles to a point where a high wt % of glass aggregate content can be achieved in the final product (such as about 91-93 wt %). The angular facets 22A also hinder the migration of smaller sized particles 20A to fill the voids 25A between larger sized particles.

FIG. 3B shows the second glass aggregate mixture 18B in which the glass particles 20B have been shape-modified to controllably-soften the glass particle facets 22B, such that the facets are substantially devoid of sharp edges and instead have smooth more rounded edges 24B. FIG. 3B also depicts the presence of various fine and ultra-fine glass particles 26B representing shape-modification byproducts produced by the particle modification process. The angular facets 22B have been smoothed out to achieve a more suitable particle shape, allowing the glass particles 20B to seat in a close enough proximity to minimize the voids to a point where a high wt % of glass aggregate can be achieved in the final product (such as about 91-93 wt %). Smaller glass particles 20B that are included in the dry mix and the fine and ultra-fine glass particles 26B produced by the particle modification process are then able to migrate more easily to the voids 25B between the particles. This further reduces the total volume of the voids 25B, which in turn results in a reduction in the wt % of thermosetting resin binder required to fill the voids.

Figure 4:
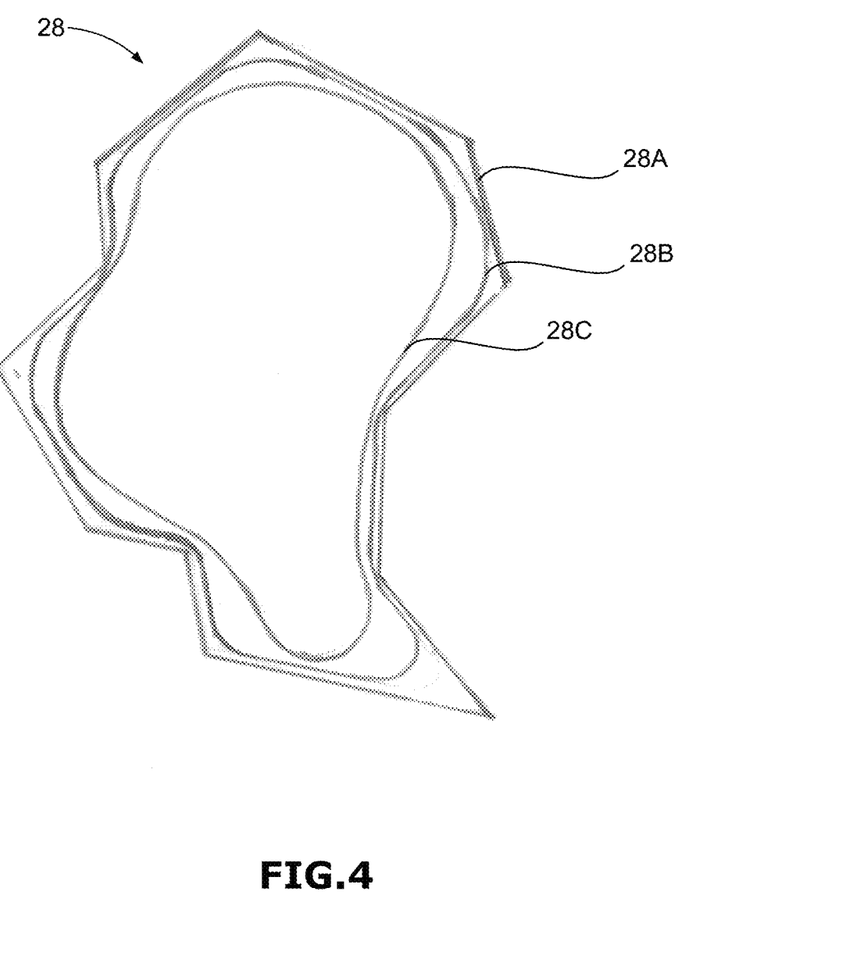
FIG. 4 is a diagrammatic representation of a random glass aggregate particle showing the effects of different types of shape-modification to controllably-soften the particle facets.

FIG. 4 further illustrates how particle modification can soften the glass particles by smoothing out their angular facets and easing their sharp edges. FIG. 4 is a diagrammatic representation of a random glass aggregate particle 28 showing the effects of different types of particle modification. The outer contour 28A shows the glass particle 28 in its raw material state immediately following the particle's formation by way of a conventional crushing (or grinding) operation. This is the state the particle is in when it is introduced into the rotating chamber 4. In this condition, the particle 28 has highly angular facets and extremely sharp edges. The middle contour 28B shows the glass particle 28 after particle modification has been performed using a wetting agent. In this condition, the facets are less angular and the edges are smoother and more rounded. The interior contour 28C shows the glass particle 28 after particle modification has been performed without a wetting agent. In this condition, the grinding process has been too aggressive. Particle modification without a wetting agent may also result in an excessive production of ultra fine shape-modification by-product particles. Besides excessive volume of such by-product particles being produced, the individual particle surfaces may not be suitably shaped.

Variable parameters of the particle modification process include (1) starting material size ranges and ratios, (2) rotation chamber size, (2) rotation speed, (3) cumulative rotation time, (4) time of wetting agent addition, (5) time of heated air introduction, and (6) heated air temperature. Each of these parameters may be adjusted as needed to produce desired particle shapes. In some cases, it may be desirable to periodically perform glass particle sampling to ascertain the progress of shape modification as the glass aggregate is tumbled. Examination of particle shape changes such as those illustrated in FIG. 4 may then be used to determine when to terminate the shape modification process.

Table 1 below illustrates standard mesh sizes and their corresponding dimensions. The illustrated mesh sizes represent the range of commercially available mesh sizes that are considered "off the shelf" ranges. Custom mesh sizes and ranges can be manufactured to required specifications.

TABLE 1

GLASS Aggregate

| Mesh Range | Diameter (mm) |
|---|---|
| 2#-4# | 8-4.75 |
| 4#-6# | 4.75-3.35 |
| 6#-8# | 3.35-2.36 |
| 8#-10# | 2.36-1.7 |
| 8#-16# | 2.36-1 |
| 10#-16# | 1.7-1 |
| 16#-26# | 1-0.65 |
| 16#-30# | 1-0.55 |
| 26#-40# | 0.65-0.38 |
| 30#-50# | 0.55-0.27 |
| 40#-70# | 0.38-0.212 |
| 50#-80# | 0.27-0.18 |
| 70#-120# | 0.212-0.12 |
| 400# | 0.038 |
| 800# | 0.018 |

Dry Mix Examples

Three dry mix examples will now be described that have been prepared and successfully used in manufacturing an agglomerate glass surface product. These examples shows three variations of mesh sizes and proportions by weight to produce a standard sized slab measuring about 10 ft. in length, about 4.65 ft. in width, and about 0.8 in. thick (prior to a calibration operation (see below) that reduces the thickness to a standard surface product thickness of about ¾"). In each example, the dry mix allowed the formation of agglomerates having a wt % above 90%, with two examples producing 91 wt % and a third example producing 93 wt %. The dry mixes included substantial weight percentages of fine mesh glass particle sizes of about 400#, and smaller weight percentages of ultra-fine particle mesh sizes of less than about 400#.

Example 1: Glass Aggregate Content Around 93 wt % of Agglomerate

| Mesh | Weight | Particle Dia. (mm) | Weight Percent of aggregate |
|---|---|---|---|
| 2-6 # | 88.7 KG | 8-3.35 mm | 31.8 wt % |
| 6-8 # | 26.6 KG. | 3.35-2.36 mm | 9.5 wt % |
| 8-16 # | 9.3 KG. | 2.36-1 mm | 3.3 wt % |
| 16-30 # | 30.9 KG. | 1-0.55 mm | 11.1 wt % |
| 70-120 # | 32.7 KG. | 0.212-0.12 mm | 11.7 wt % |
| 400 # | 85.4 KG. | 0.038 mm | 30.7 wt % |
| *<400 # | +_ 5 kg | ≤->0.038 mm | 1.8 wt % |

*Produced during particle modification process

Example 2 Glass Aggregate Content Around 91 wt % of Agglomerate

| Mesh | Weight | Particle Dia. (mm) | Weight percent of aggregate |
|---|---|---|---|
| 6-8 # | 73.4 KG | 3.35-2.36 mm | 26.6 wt % |
| 8-16 # | 29.3 KG | 2.36-1 mm | 10.6 wt % |
| 16-26 # | 23.3 KG | 1-0.65 mm | 8.4 wt % |
| 40-70 # | 48.5 KG | 0.38-0.212 mm | 17.5 wt % |
| 400 # | 97.6 KG | 0.038 mm | 35.2 wt % |
| *≤->400 # | +_ 5 kg | ≤->0.038 mm | 1.8 wt % |

*Produced during particle modification process

Example 3: Glass Aggregate Content Around 91 wt % of Agglomerate

| Mesh | Weight | Particle Dia. (mm) | Weight percent of aggregate |
|---|---|---|---|
| 16-26 # | 39.5 KG | 1-0.65 mm | 14.3 wt % |
| 26-40 # | 104 KG | 0.65-0.38 mm | 37.7 wt % |
| 40-70 # | 35.5 KG | 0.38-0.212 mm | 12.9 wt % |
| 400 # | 92 KG | 0.038 mm | 33.3 wt % |
| *≤->400 # | +_ 5 kg | ≤->0.038 mm | 1.8 wt % |

*Produced during particle modification process

Wet Mix

The wet mix process may begin with weighing a thermoset resin to determine a minimum ratio of around 7 wt % to the final agglomerate. This weight percentage may vary according to the mesh ratio used in the dry mix. The thermoset resin used in producing the slabs discussed in connection with the three dry mix examples above was an unsaturated polyester resin. As previously noted, various other thermosetting resins could also be used.

If a colorant is to be added to the agglomerate, a certain amount of thermoset resin may be removed from the pre-weighed batch of resin and mixed with a desired amount (e.g., around 1.5 wt %) of a suitable coloring agent. The resin/colorant mixture may be fed through a horizontal pigment mill to achieve effective dispersal of the coloring agent. The resin/colorant mixture may then added back to the main batch of resin.

Around 1.5 wt % of a conventional thermoset hardener (catalyst) and coupling agent (as used in the manufacture of engineered stone, for example) may then be added to the colored resin mixture. The resultant mixture may then be further mixed in a vertical mixer to ensure complete dispersal of all the components. This mixture may be referred to as a "wet mix."

Wet Aggregate Mix

The dry mix and the wet mix may placed into a batch mixer and mixed together for a period of time that is sufficient to ensure uniform distribution of all components. At this stage the dry-wet mixture may be referred to as a "wet aggregate mix."

In some embodiments, the wet aggregate mix may be transferred directly to a slab press (see below). In other embodiments, two or more batches of wet aggregate mixes, of differing color and/or glass particle mesh size proportions, may be mixed in separate batch mixers. These separate wet aggregate mixes may then be further processed to separate the main body of each wet aggregate mix into smaller sized portions by feeding the wet aggregate mix through a roller with finger-like protrusions. The separate smaller-portion batches may then be mixed together and transferred onto the slab press. Other methods and equipment for separating the wet aggregate mix into smaller sized portions may also be used.

Slab Pressing

Pressed slabs such as the slab 2 depicted in FIG. 1 may be produced using a conventional slab press operation as presently used in the manufacture of engineered stone. The wet aggregate mix may be transferred into a steel frame that determines the slab size on the slab press. The wet aggregate mix may be evenly spread out within the frame by a mechanical mixer/laying machine or by hand with a wooden rake. A hydraulic press that covers the full area of the frame may be lowered onto the wet aggregate mix. A rubber seal may be inserted around the bed of the press to create an airtight seal around the wet aggregate mix. A mechanical vibrator located on top the bed of the press may be activated while the aggregate mix is placed under vacuum using a mechanical vacuum pump. The slab may then be pressed at a pressure of about 120 tons for a suitable time, such as about 180 seconds. During this process, the mechanical vibrator causes the aggregate particles to vibrate and settle into an optimal packing arrangement having minimal inter-aggregate void size through which the thermosetting resin will become infused.

Curing

After slab pressing, the uncured slab may be cured in an oven at a suitable temperature and for a suitable duration. In an embodiment, the slabs may be cured at about 85 degrees Celsius for a period of about 50 minutes.

Calibrating and Polishing

Following curing, the slab may be transferred to a conventional stone calibrating and polishing line where it is calibrated to a desired thickness, usually but not limited to ½," ¾" or 1¼" thickness and polished to the desired gloss level. The slab is then ready to be processed further into a surface or desired shape, size, etc.

Accordingly, an agglomerate glass surface product and related manufacturing method have been disclosed. Although various embodiments have been described, it should be apparent that many variations and alternative embodiments could be implemented in accordance with the inventive concepts disclosed herein. It will therefore be understood that the invention is not to be in any way limited except in accordance with the spirit of the appended claims and their equivalents.

What is claimed is:

1. An agglomerate glass surface product, comprising:
    an agglomerate formed predominantly of transparent glass aggregate having controlled proportions of different glass particle sizes bound by a cured thermoset binder infused within substantially all inter-aggregate voids;
    the agglomerate having a glass aggregate content by weight that is greater than the content by weight of any other constituent of the agglomerate;
    the glass aggregate having a maximum particle size of 2-6# mesh;
    the agglomerate having approximately 7-10 wt % of the cured thermoset binder;
    the cured thermoset binder including a colorant providing desired coloring of the glass aggregate in an amount sufficient to impart natural stone opacity to the agglomerate;
    the agglomerate being in the form of a pressed slab that is substantially non-porous and substantially devoid of air inclusions throughout an entire thickness of the slab;
    the glass aggregate being substantially uniformly mixed with the thermoset binder throughout the entire thickness of the slab and exposed at all surfaces of the slab;
    at least one surface of the slab being polished;
    the at least one polished surface comprising exposed surface-layer transparent glass aggregate particles of the different glass particle sizes, with colored sub-surface thermoset binder being visible in inter-aggregate voids that lie underneath the surface-layer glass aggregate particles at varying depths according to the different glass particle sizes; and
    whereby the pressed slab has the look and feel of a polished natural stone slab.

2. The agglomerate glass surface product of claim 1, wherein the glass aggregate is a shape-modified glass aggregate having controllably-softened particle facets that are substantially devoid of sharp edges.

3. The agglomerate glass surface product of claim 1, wherein the glass aggregate ranges in particle size between a mesh size of 2-6# to a mesh size of less than 400#.

4. The agglomerate glass surface product of claim 1, wherein at least 30 wt % of the glass aggregate has a mesh size not exceeding 400#.

5. The agglomerate glass surface product of claim 1, wherein about 1.8 wt % of the glass aggregate has a mesh size of less than 400# in the form of ultra-fine shape-modification byproducts.

6. The agglomerate glass surface product of claim 1, wherein the colorants include pigments or other coloring agents.

7. The agglomerate glass surface product of claim 1, further including non-glass material selected from the group consisting of natural stone, metals, and seashells.

8. The agglomerate glass surface product of claim 7, wherein the non-glass material comprises quartz or marble.

9. The agglomerate glass surface product of claim 1, wherein the glass aggregate is present in the agglomerate at a concentration of between about 91-93 wt % the total weight of the slab.

10. The agglomerate glass surface product of claim 1, wherein the glass aggregate is present in the agglomerate at a concentration of about 93 wt % the total weight of the slab, and wherein about 31.8% of the aggregate has a mesh size between 2-6#, about 9.5% of the aggregate has a mesh size between 6-8#, about 3.3% of the aggregate has a mesh size between 8-16#, about 11.1% of the aggregate has a mesh size between 70-120#, about 30.7% of the aggregate has a mesh size of 400#, and about 1.8% of the aggregate has a mesh size of less than 400#.

11. The agglomerate glass surface product of claim 1, wherein the glass aggregate is present in the agglomerate at a concentration of about 91 wt % the total weight of the slab, and wherein about 26.68% of the aggregate has a mesh size between 2-8#, about 10.6% of the aggregate has a mesh size between 8-16#, about 8.4% of the aggregate has a mesh size between 16-26#, about 17.5% of the aggregate has a mesh size between 40-70#, about 35.2% of the aggregate has a mesh size of 400#, and about 1.8% of the aggregate has a mesh size of less than 400#.

12. The agglomerate glass surface product of claim 1, wherein the glass aggregate is present in the agglomerate at a concentration of about 91 wt % the total weight of the slab, and wherein about 14.3% of the aggregate has a mesh size between 16-26#, about 37.7% of the aggregate has a mesh size between 26-40#, about 12.9% of the aggregate has a mesh size between 40-70#, about 33.3% of the aggregate has a mesh size of 400#, and about 1.8% of the aggregate has a mesh size of less than 400#.

13. The agglomerate glass surface product of claim 1, wherein the slab has a substantially uniform thickness of between 0.5-1.25 in.

14. A method for manufacturing the agglomerate glass surface product of claim 1, comprising:
   preparing a dry mixture containing the glass aggregate;
   preparing a wet mixture containing an uncured thermosetting resin, the colorant, and a thermoset hardener;
   preparing a wet aggregate mixture containing the dry mixture and the wet mixture;
   placing the wet aggregate mixture in a slab press and vibrating while applying vacuum, then applying positive pressure for a selected time while continuing to vibrate to create an uncured slab;
   curing the slab at a selected time and temperature to produce a cured slab; and
   calibrating the cured slab to a desired thickness, and polishing to a desired gloss level to produce the final pressed slab.

15. The method of claim 14, wherein preparing the dry mixture includes using a particle modification process on raw crushed or ground glass aggregate to produce shape-modified glass aggregate having controllably-softened particle facets that are substantially devoid of sharp edges.

16. The method of claim 15, wherein the particle modification process includes using a wetting agent to control particle modification.

17. The method of claim 15, wherein the particle modification process includes using heated, substantially moisture-free air to break up lumps of fine or ultra-fine glass particles representing shape-modification by-products.

18. An agglomerate glass surface product, comprising:
   an agglomerate formed predominantly of transparent glass aggregate having controlled proportions of different glass particle sizes having a maximum particle size of 6-8# mesh;
   the agglomerate having a glass aggregate content by weight that is greater than the content by weight of any other constituent of the agglomerate;
   a cured thermoset binder including a colorant providing desired coloring of the glass aggregate in an amount sufficient to impart natural stone opacity to the agglomerate;
   the agglomerate having approximately 7-10 wt % of the cured thermoset binder;
   the agglomerate further including non-glass aggregate comprising particles of natural stone;
   the aggregates of the agglomerate including fine particles having a mesh size that does not exceed 400# mesh;
   the aggregates of the agglomerate being bound by the cured thermoset binder infused within substantially all inter-aggregate voids;
   the agglomerate being in the form of a pressed slab that is substantially non-porous and substantially devoid of air inclusions throughout an entire thickness of the slab;
   the aggregates of the agglomerate being substantially uniformly mixed with the cured thermoset binder throughout the entire thickness of the slab and exposed at all surfaces of the slab;
   at least one surface of the slab being polished;
   the at least one polished surface comprising exposed surface-layer transparent glass aggregate particles of the different glass particle sizes, with colored subsurface thermoset binder being visible in inter-aggregate voids that lie underneath the surface-layer glass aggregate particles at varying depths according to the different glass particle sizes; and
   whereby the pressed slab has the look and feel of a polished natural stone slab.

19. The agglomerate glass surface product of claim 18, wherein the glass aggregate has controlled proportions of different glass particle sizes having a maximum particle size of 8-16# mesh.

20. The agglomerate glass surface product of claim 18, wherein the glass aggregate has controlled proportions of different glass particle sizes having a maximum particle size of 8-26# mesh.

* * * * *